United States Patent [19]

Taylor

[11] 3,863,228

[45] Jan. 28, 1975

[54] APPARATUS FOR DETECTING AND ELMINATING A TRANSFER OF NOISE RECORDS TO A DATA PROCESSING APPARATUS

[75] Inventor: Donald R. Taylor, Framingham, Mass.

[73] Assignee: Honeywell Information Systems Inc., Waltham, Mass.

[22] Filed: Dec. 13, 1973

[21] Appl. No.: 424,527

[52] U.S. Cl. .......... 340/172.5, 340/146.1 F, 360/53

[51] Int. Cl. .............................................. G06f 3/06

[58] Field of Search...340/172.5, 146.1 F, 146.1 AB; 360/53

[56] References Cited

UNITED STATES PATENTS 3,648,256 3/1972 Paine et al. ..................... 340/172.5

*Primary Examiner*—Gareth D. Shaw
*Assistant Examiner*—Joseph M. Thesz, Jr.
*Attorney, Agent, or Firm*—Faith F. Driscoll; Ronald T. Reiling

[57] ABSTRACT

Noise detection apparatus included in a peripheral controller operates to detect automatically when a noise record has been stored in the controller buffer storage unit. The detection apparatus includes control apparatus associated with the buffer storage unit which keeps track of the number of storage locations into which data characters have been stored during a transfer operation. Also included are means for selectively establishing one or more counts corresponding to a minimum number of data characters which must be stored in the buffer storage unit before the controller starts to transfer any data characters to a data processing unit. Each time a minimum number of characters has not been previously stored in the buffer unit when the controller receives a signal indicating the completion of the transfer, the controller clears the buffer storage unit of data characters and continues the transfer.

25 Claims, 6 Drawing Figures

APPARATUS FOR DETECTING AND ELMINATING A TRANSFER OF NOISE RECORDS TO A DATA PROCESSING APPARATUS

BACKGROUND OF THE INVENTION

1. Field of Use

The present invention relates to apparatus for detecting and eliminating noise records encountered by a magnetic tape peripheral controller during a data transfer operation.

2. Prior Art

It is well known that during a tape read operation, unwanted non data signals can be sensed and transferred as one or more data characters to the main storage of a data processing unit as a normal data record. Each such group of data characters is called "a noise record." The origin of these non data or noise signals can be foreign particles or improper coding on the magnetic tape medium, creases, scratches or tears in the magnetic tape medium, improper erasures, or transient signals coupled into the sense amplifier circuits from adjacent circuits.

Many techniques have been employed for eliminating "noise records" from the actual data records. One prior art technique employs noise detection apparatus which operates to identify and eliminate the effects of noise signals transferred to the main storage of a data processing unit. This arrangement is disclosed in U.S. Pat. No. 3,490,013 titled "Apparatus for Detecting and Eliminating Noise Records During a Data Transfer Operation" invented Richard B. Lawrance et al which is assigned to the assignee of the present invention. In the arrangement disclosed by the patent, apparatus is included within the data processing unit which in response to a signal indicating the detection of a noise record, conditions control apparatus to return the main storage addressing to a starting address. This eliminates the noise record written into the main storage.

A disadvantage of the prior art arrangement is that a considerable amount of valuable input/output processing time is expended in transferring and eliminating noise records stored in main storage.

Also, because the noise records are transferred to main storage, it has been found that errors can occur as a result of adjusting the addressing of main storage when noise record has been stored in main storage. When this happens, it is difficult to diagnose the source of the error condition. A main reason for the error conditions is due to the differences in timing between the data processing unit and peripheral controller. The difference becomes more significant where the data processing unit and peripheral controller interfaces are asynchronous with respect to each other.

Accordingly, it is a primary object of the present invention to provide improved apparatus for automatically detecting "noise records" read from a magnetic storage medium by a peripheral controller.

It is a further object of the present invention to provide apparatus which eliminates "noise records" before they are transferred to the main storage of data processing unit.

It is a more specific object of the present invention to provide apparatus which can selectively establish different criteria for identifying a "noise record."

SUMMARY OF THE INVENTION

The above objects are achieved in a preferred embodiment of the present invention by an addressable buffer storage unit included in a peripheral controller arranged to store data characters read from a magnetic tape medium. Control apparatus coupled to the buffer storage unit is operative to establish a predetermined minimum count corresponding to the number of data characters transferred into the buffer. When the minimum count is met, control means is operative to detect whether a higher minimum count is required. Upon sensing that all of the minimum counts have been met, the control means sets an indicator signaling that the data characters stored in the buffer storage unit is not a noise record. Data transfer means coupled to the indicator are enabled to transfer the stored data characters under the control of the peripheral controller. When the peripheral controller receives a signal indicating the completion of the transfer and the indicator has not been previously set, the controller clears the buffer storage unit and associated circuits and continues the transfer.

By providing buffer storage for processing the largest minimum size data record for one of a number of different data formats, the arrangement of the present invention eliminates the need for having to transfer a noise record into the main storage of the data processing unit. Thus, the arrangement does not tie up an input/output transfer channel by insuring that only the data characters of an actual data record will be transferred to the data processing unit. Also, the arrangement prevents any errors from occurring as a result of having transferred noise records to the data processing unit.

The above and other objects of the present invention are achieved in the preferred embodiment described hereinafter. The novel features which are believed to be characteristic of the invention, both as to its organization and method of operation, together with further objects and advantages will be better understood from the following description when considered in connection with the accompanying drawings. It is to be expressly understood, however, that each of the drawings are for the purpose of illustration and description only and are not intended as a definition of the limits of the present invention.

DESCRIPTION OF THE PREFERRED EMBODIMENT

Figure 1:
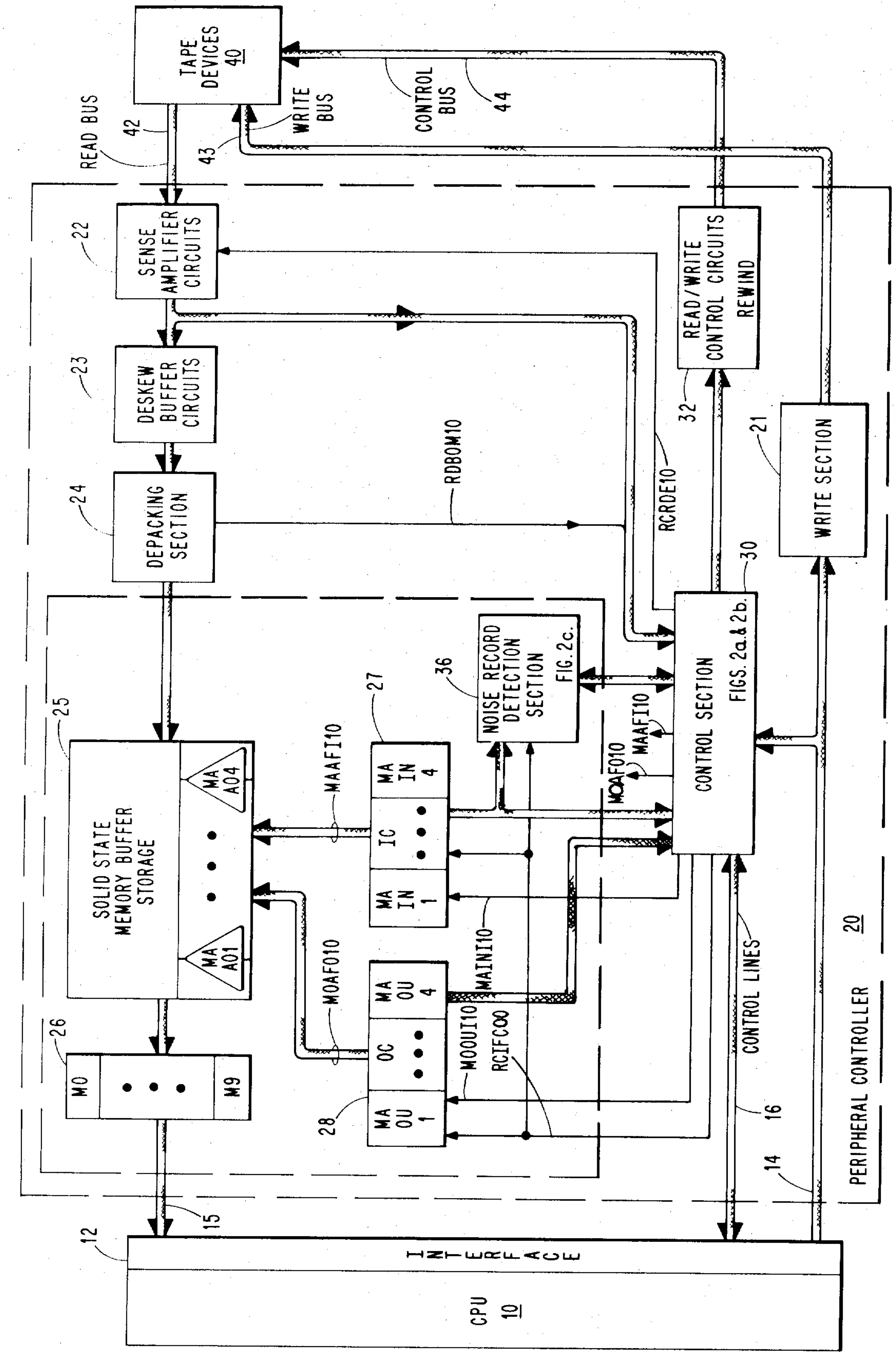
FIG. 1 is a block diagram of a peripheral controller which incorporates the apparatus of the present invention.

Referring now to FIG. 1, there is shown a portion of data processing system which includes a central processing unit (CPU) 10, a main storage unit, not shown, a magnetic tape peripheral controller 20 and a plurality of magnetic tape transport devices 40. The CPU 10 couples includes an input-output processing section designated as a peripheral interface 12 which can access the main storage independently of the CPU. The peripheral interface in response to an input/output instruction operatively couples the peripheral controller 20 to main storage via a specified one of a plurality of read/write channels during the execution of a specified data transfer operation. The peripheral interface can be considered conventional in design and can, for example, take the form of interface described in the U.S. Pat. No. 3,364,684 to Walter R. Lethin et al titled "Information Handling Apparatus" which issued to the assignee of the present invention.

Each of the tape transport devices 40, conventional in design, converts the recorded flux signals on the magnetic tape medium into electrical signals during a read operation and performs the converse of this operation during a write operation. The analog signals read and recorded from a read head and a write head of a selected one of the devices are transferred between the selected device and controller 20 via read bus 42 and write bus 43 as shown. The devices 40 respond to commands applied via a bus 44 to move tape in either a forward or backward direction.

The peripheral controller 20 receives timing signals FT110 through FT810 via one of the lines of a control bus 16 of the peripheral interface 20. These signals synchronize transfers of data characters, control and status information between the controller 20 and the CPU/-main storage. During a write operation, characters read from main storage are applied via a CPU output bus 14 to a write section 21 which packs the six data bits of the characters as required and applies them to bus 43 for writing them on a nine channel tape in either a 1×1, 2×1 or 4×3 format. In a 1×1 format, the six data bits, a pair of punctuation bits and a parity bit of each main storage characters are written as a single nine frame on tape. In a 2×1 format, two main storage characters (i.e., two data bits of a first character and six data bits of a second character and a parity bit) are written as a single nine bit frame on tape. Lastly, in a 4×3 format, four main storage characters (i.e., six data bits of four consecutive characters and a parity bit) are written as three consecutive nine bit frames on tape.

During a read operation, the frames read from tape are applied to sense amplifier circuits of block 22 via bus 42. The amplifier circuits convert the analog bus signals into digital signals apply them to the deskew circuits of block 23. The frames are "deskewed" by the deskew circuits and depacked into main storage characters by circuits of a depacking section 24. The data characters are then written into a solid state memory buffer storage unit 25. Thereafter, upon being granted access to main storage, the data characters are read out via and output register 26 to a CPU input bus 15 for storage into the main storage. At that time, each data character is checked for correct parity by checking means, not shown. The circuits mentioned can be considered conventional in design. Also, the circuits may take the form of apparatus disclosed in co-pending application titled "Apparatus for Assembling and Disassembling Data Characters Transferred between Data Handling Devices" invented by Donald R. Taylor bearing Ser. No. 424,528 which is assigned to the same assignee named herein.

The solid state memory buffer unit 25, is conventional in design and can take the form of a read/write solid state memory array disclosed in a text titled "The Integrated Circuits Catalog for Design Engineers" published by Texas Instruments Corporation dated 1972. In the present system, the unit 25 includes 16, 9 bit storage locations addressable by either an in counter 27 or an out counter 28. Each counter has 4 stages made up of two, two stage grey code counters, conventional in design. The counters are incremented by one of a pair of signals MOOUI10 and MAINI10 generated by a control section 30. The counter 27 is cleared to all ONES and the counter 28 is cleared to ZEROS by an initial and final clear signal RCIFC30 also generated by section 30. The address contents of each counter is applied to a number of address amplifier circuits MAA01 through MAA04 in response to signals MOAFO10 and MAAFI10 generated by section 30. Also, the address signals from the counters are applied as inputs to the control section 30.

The section 30 by comparing the values of the address signals from the two counters establishes whether the buffer storage unit 25 contains data characters to be transferred as explained herein. Accordingly, the section 30, as explained herein, forwards requests to the interface 12 to access main storage (i.e., request for a CPU cycle in a cycle stealing interface) via one of a number of control lines of a bus 16. Other ones of the lines of bus 16 apply timing signals and control signals from the CPU which signal when command control and parameter characters are being transmitted to the controller 20 via bus 14. Also, the controller 20 applies signals and other signals indicating the end of a data transfer operation which causes a release of the "data or read/write channel."

The control section 30 also provides command signals to the read/write control circuits of block 32 for enabling the read and write circuits of the addressed one of the transport devices in addition to signals fo moving tape and accepting data characters placed on bus 43. Also, the addressed device sends control signals indicating when the device is cycled up and ready to accept commands, has detected beginning of tape (BOT) signals and end of tape (EOT) signals.

Additionally, the control section 30 receives control signals from the noise record detection section 36 which forms a part of the apparatus of the present invention. It is this section which determines when storage unit 25 is storing data characters of an actual data record. As explained herein, the section establishes one or more criteria which must be met before a transfer of data takes place. The section 36 receives signals from section 30 which are used to determine when the established criteria have been met. The control section 30 and noise record detection section 36 will now be considered in greater detail.

CONTROL SECTION 30

Figure 2A:
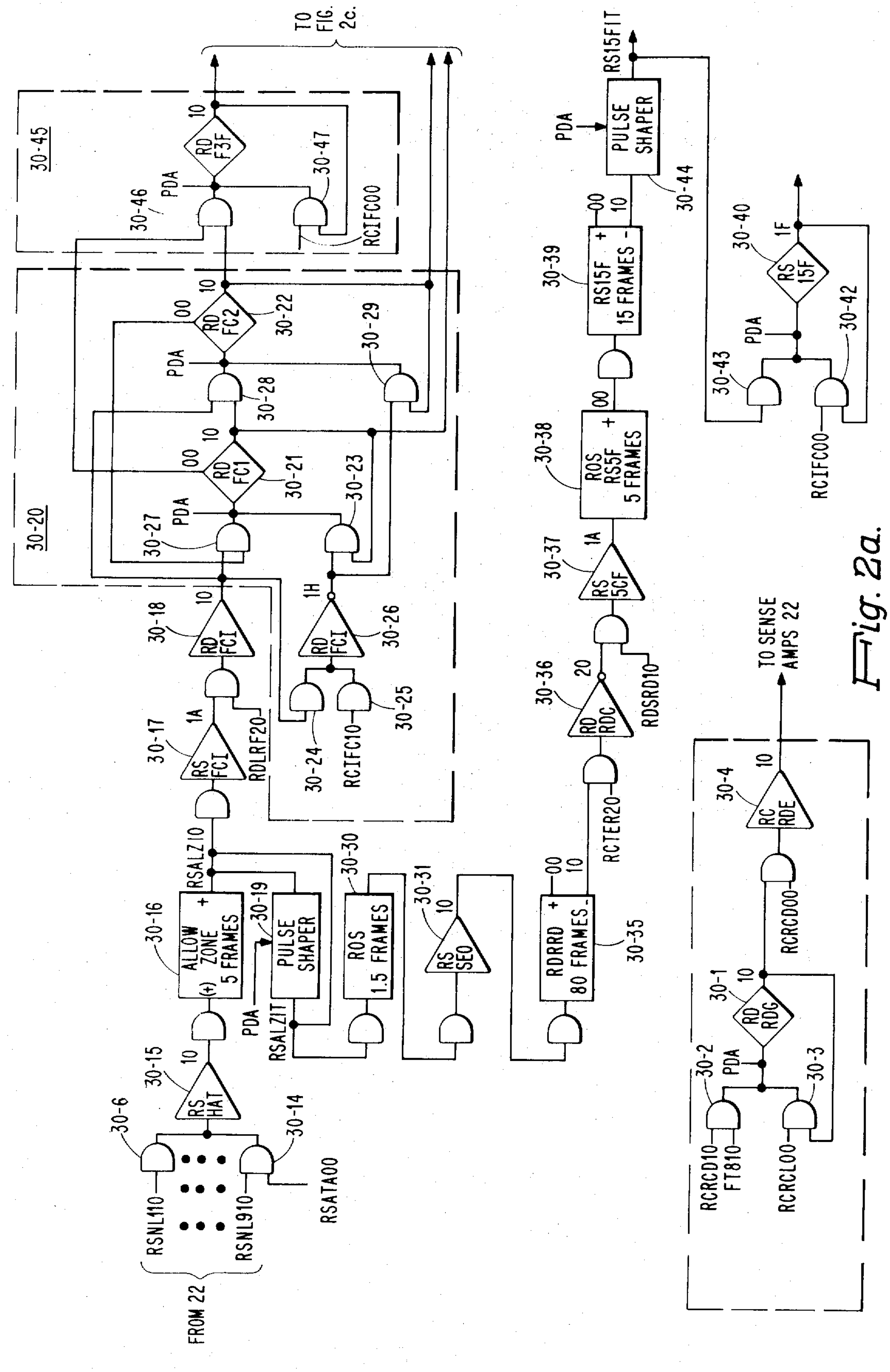
FIGS. 2*a* and 2*b* show in greater detail the control section of the peripheral controller of FIG. 1.

FIGS. **2*a* and 2*b* show portions of the control section 30 in greater detail. Referring first to FIG. 2*a*, it is been that the control section 30 receives the digital signals RSNL110 through RSNL910 representative of data sensed by the sense amplifier circuits of 22. The amplifier circuits 22 are enabled by a signal RCRDE10 generated by a read gate flip-flop 30-1 and an AND gate and amplifier circuit 30-4. The flip-flop 30-1 switches to a binary ONE following the start of a chatter delay (i.e., when a signal RCRCD10 is a binary ONE) in response to an interface timing signal FT810 applied via bus 16 being forced to a binary ONE. After the delay, which insures that all transients occurring during the start of moving tape, signal RCRCD00 switches to a binary ONE. The AND gate and amplifier circuit 30-4 forces the enabling signal RCRDE10 to a binary ONE allowing the digital signals to be applied to a plurality of AND gates 30-6 through 30-14. Normally, signal RSATA00 is a binary ONE and any one of the pulse signals RSNL110 through RSNL910 applied via an amplifier circuit 30-15, switches a one shot circuit 30-16. The one shot circuit 30-16 fires on a positive going transition to produce a pulse signal RSALZ10 having a duration of 0.5 of a frame. This interval defines the amount of acceptable skew between the signals of the frame (i.e., from the time of a first pulse to the last pulse of the frame). Also, the signal RSALZ10 is applied to a pulse shaper 30-19 which generates an output RSALZIT pulse signed at the trailing edge of signal RSALZ10. The signal RSALZ1T indicates that a frame has been read by the address tape device and has been applied to read bus 42. The output signals from shaper circuit 30-19 are applied to a frame counter 30-20 via a pair of gate and amplifier circuits 30-17 and 30-18. Also, the same signals are applied to a first resettable one shot circuit 30-30 and then to a record detector circuit 30-35 via a gate and amplifier circuit 30-31.**

The frame counter 30-20 includes a pair of flip-flops 30-21 and 30-22 in addition to a plurality of circuits 30-23 through 30-29 arranged as shown. The circuits of the counter 30-21 are interconnected to operate as a 2 state grey code counter. The flip-flops 30-21 and 30-22 are cleared to ZEROS when the initial and final clear signal RCIFC10 is forced to a binary ONE. The binary ZERO and binary ONE output sides of flip-flops 30-21 and 30-22 respectively are applied to a count 3 frames flip-flop 30-45 via an AND gate 30-46. The flip-flop switches to a binary ONE when frame counter 30-20 has counted three frames. The flip-flop 30-45 resets to a binary ZERO via an AND gate 30-47 when clear signal RCIFC10 switches to a binary ONE which forces signal RCIFC00 to a binary ZERO.

As mentioned above, the pulse signals produced by one shot circuit 30-16 are first applied to a resettable one shot circuit 30-30. This last mentioned circuit is a DC coupled resettable one shot circuit, conventional in design, which serves as a dropped frame detector.

A first pulse switches the circuit 30-35 from a first to a second state. The circuit remains in that state until there is an absence of further input signals for a predetermined period of time indicative of a dropped frame (i.e., for an interval corresponding to 1.5 frames), the circuit then returns automatically to its first state.

The record detector 30-35 is also a DC coupled resettable one shot circuit and operates in a fashion similar to circuit 30-30. However, it remains on for a much longer time (i.e., for an interval approximating 80 frames which corresponds to the time for a head to traverse 0.1 inch of tape). Thus, in the absence of signals for 80 frames, the circuit 30-35 returns automatically to a first state. When the record detector 30-35 switches at the beginning of a read operation, it conditions a pair of series connected resettable one shot circuits 30-38 and 30-39 to switch a flip-flop 30-40 to a binary ONE. The state of this flip-flop indicates that the record detector circuit 30-35 was turned on. In greater detail, the circuit 30-35 when switched to a second state forces signal RDRRD10 to a binary ONE. A signal RCTER20, normally a binary ONE, together with signal RDRRD10 causes an AND gate and inverter circuit 30-36 to force signal RDRDC10 to a binary ONE. An AND gate and amplifier circuit 30-37 forces signal RS5CF1A to a binary ZERO. After an interval of 5 frames, resettable one shot circuit 30-38 switches from its second state to its first state forcing signal RS5F00 to a binary ZERO. This causes resettable one shot circuit 30-39, after an interval of 15 frames, to switch from its second state to its first state forcing signal RS15F10 to a binary ONE.

When the record detector circuit 30-35 "falls" or "times out," it causes both resettable one shot circuits 30-38 and 30-39 to switch on immediately. When circuit 30-39 switches state, it conditions a pulse shaper circuit 30-44, conventional in design, to generate a clocked PDA pulse in response to the trailing edge (i.e., negative going transition) of signal RS15F10. This causes flip-flop 30-40 to switch to a binary ONE via a gate 30-43 indicating that the record detector circuit had been set. An AND gate 30-42 resets flip-flop 30-40 to a binary ZERO when clear signal RCIFC00 is forced to a binary ZERO.

Also included in the control section 30 are a plurality of control flip-flops which signal when a read operation is over. These include flip-flops 30-50, 30-51, and 30-52 in addition to a plurality of AND gates 30-54 through 30-59 arranged as shown. The AND gate 30-54 switches the end of record flip-flop 30-51 to a binary ONE when the record detector circuit 30-35 signals an end of record (i.e., signal RS15F1T is generated) and the noise detector section signals the absence of a noise record (i.e., signal RCNNR10 is a binary ONE). The AND gate 30-55 resets flip-flop 30-50 to a binary ZERO when clear signal RCIFC00 is forced to a binary ZERO.

When flip-flop 30-50 forces signal RCEOR1B to a binary ONE, a gate circuit 30-60 causes AND gate 30-56 to switch read is over flip-flop 30-51 to a binary ONE (i.e., signal RCRN02A is normally a binary ONE). The AND gate 30-57 switches flip-flop 30-51 to a binary ZERO when terminate read flip-flop 30-52 switches to a binary ONE. The AND gate 30-58 switches flip-flop 30-52 to a binary ONE in response to interface timing signal FT830. At the termination of signal FT820, AND gate 30-59 switches flip-flop 30-52 to a binary ZERO. The signal RCTRD10 is applied to circuits, not shown, which generate signals including signal RCRCL00 for clearing all of the circuits involved in the read operation.

Figure 2B:
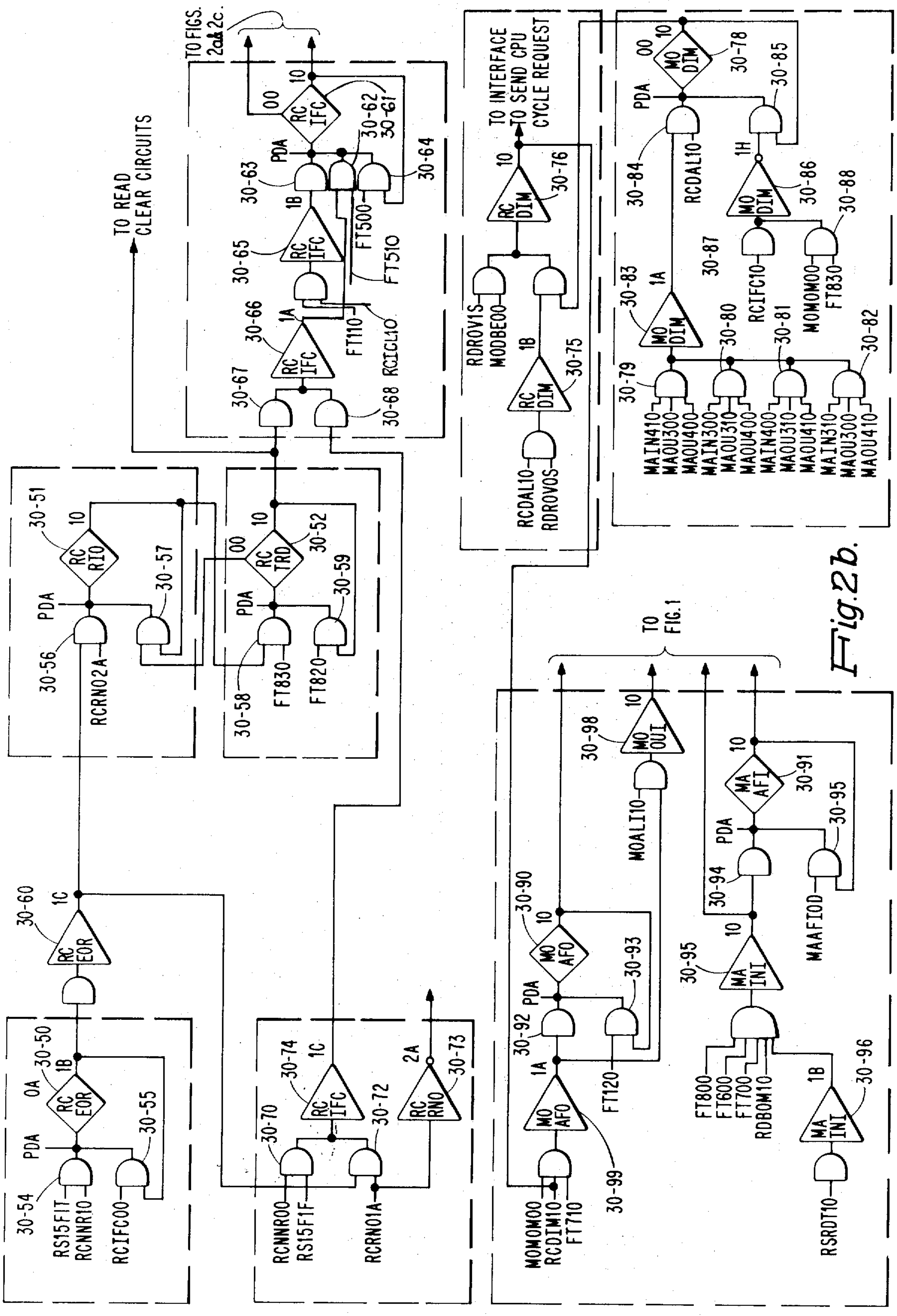

As shown, FIG. 2*b* also includes an Initial and Final Clear flip-flop 30-61 with associated circuits 30-63 through 30-69 arranged as shown. This flip-flop switches to a binary ONE when either signal RCTRD10 or a new clear signal RCIFC10 applied via gate 30-67 and gate 30-68 respectively switches to a binary ONE. This causes AND gate and amplifier circuit 30-65 to switch flip-flop 30-61 in response to an interface timing signal FT110 and a PDA signal via gate 30-62. Similarly, an initial clear signal RCICL10 switches flip-flop 30-61 to a binary ONE via an AND gate and amplifier circuit 30-65 and gate 30-63 when interface signal FT510 switches to a binary ONE. As mentioned herein, signal RCICL10 is forced to a binary ONE when a command has been stored (i.e., signal RAROS10=1) and the controller is not busy (i.e., signal RCRBY00=1). AND gate 30-64 resets the flip-flop 30-62 to a binary ZERO when interface signal FT500 switches to a binary ZERO.

A pair of AND gates 30-70 and 30-72 are operative to condition an amplifier circuit 30-74 to force clear signal RCIFC1C to a binary ONE. AND gate 30-70 so operates when a signal RCNNR00 indicative of a noise record and signal RS15F1F indicative of the record detector having been set are both binary ONES. At the end of a record (i.e., signal RCEOR1C is a binary ONE) and when signal RCRNO1A is a binary ONE, AND gate 30-72 forces clear signal RCIFC1C to a binary ONE. An inverter circuit 30-73 inverts signal RCRNO1A and produces signal RCRNO2A. Signal RCRNO1A when a binary ONE indicates that the read operation is not over. It switches to a binary ZERO at the end of a count in the case of a multirecord read operation and upon sensing a tape mark in the case of a tape mark search read operation.

Additionally, FIG. 2*b* shows the circuits which generate a request signal RCDIM10 to the interface 12 for a CPU cycle to access main storage for writing a data character into storage. These circuits include a pair of series connected AND gate and amplifier circuits 30-75 and 30-76. During the read operation, circuit 30-75 forces signal to a binary ONE when the record is not over (i.e., signal RDROVOS is a binary ONE) and the buffer storage unit 25 stores an actual data record (i.e., signal RCDAL10 is a binary ONE). A first AND gate of circuit 30-76 in response to signal RCDIM1B forces signal RCDIM10 to a binary ONE when there is data in memory (i.e., signal MODIM10 is a binary ONE). A second AND gate of circuit 30-76 forces signal RCDIM10 to a binary ONE at the end of the record (i.e., when signal RDROV1S is a binary ONE) when the storage unit 25 is not empty (i.e., when signal MODBE00 is binary ONE).

The signal MODIM10 is from a data in memory flip-flop 30-78 which compares the address signals from the in counter 27 and out counter 28 via a plurality of AND gates 30-79 through 30-82 and conditions an amplifier circuit 30-83 to force signal MOD1M1A to a binary ONE when a difference of 8 between the counter addresses is detected. This causes an AND gate 30-84 to switch flip-flop 30-78 to a binary ONE when signal RCDAL10 is a binary ONE.

A difference of 8 is selected to prevent transferring incorrect data characters to main storage. More specifically, when writing data characters in 4×3 format, the last group of characters written on tape may include 1, 2, 3 or 4 characters depending upon when the programmer stopped his program. A marker frame is included within the record to indicate the number of actual data characters. During the read operation, the controller does not know the number of data characters to be transferred to main storage until it receives the marker frame. To provide for this, the buffer storage unit is conditioned to retain a minimum of 8 characters.

When the buffer output register 26 is cleared to ZEROS after the data character has been transferred (i.e. signal MOMOMOO is a binary ONE), there is less than a difference of 8, (i.e., signal MOD1M1A is a binary ZERO), an AND gate 30-88 resets flip-flop 30-78 to a binary ZERO via inverter circuit 30-86 and AND gate 30-85 at the end of a cycle when interface timing signal FT830 switches to a binary ONE. Also, the flip-flop is reset to a binary ZERO via a gate 30-87 when clear signal RCIFC10 switches to a binary ONE.

A pair of flip-flops 30-90 and 30-91 and input gates 30-92 through 30-95, arranged as shown, provide output signals MOAFO10 and MAAFI10 which apply the address contents of counters 28 and 27 to buffer storage unit 25. The AND gate 30-92 switches flip-flop 30-90 to a binary ONE when an AND gate and amplifier circuit 30-99 forces signal MOAFO1A to a binary ONE. This happens when the output register 26 is empty (i.e., signal MOMOMOO is a binary ONE), a CPU cycle request has been made (i.e., signal RCDIM10 is a binary ONE), when interface timing signal FT710 switches to a binary ONE. AND gate 30-93 resets the flip-flop to a binary ZERO when interface timing signal FT120 is switched to a binary ZERO.

The gate 30-94 switches flip-flop 30-91 to a binary ONE when an AND gate and amplifier circuit 30-95 forces an increment signal MAINI10 to a binary ONE. The AND gate 30-95 resets flip-flop 30-91 to a binary ZERO one PDA pulse later when signal MAAFIOD is switched to a binary ZERO.

The circuits 30-98 and 30-95 provide increment signals MOAFO10 and MAINI10 for counters 28 and 27. Before a data character is written into the buffer storage unit 25, the AND gate and amplifier circuit 30-95 forces increment signal MAINI10 to a binary ONE at a time specified by timing signals FT800, FT600, and FT700 when a data character has been stored in the depacking section (i.e., signal RDBOM10 is a binary ONE) at read data time (i.e., when signal RSRDT10 is a binary ONE) which causes gate and amplifier circuit 30-96 to force signal MAINI1B to a binary ONE. Thus, the data character is written into the storage location designed by the incremented address stored in in counter 27.

After a data character is read from the unit 25, the AND gate and amplifier circuit 30-98 forces increment signal MOOUI10 to a binary ONE when signal MOAFO1A and allow signal MOALI10 are binary ONES. Hence, the data character is read out from the address stored in out counter 28 which is then incremented by one. The times selected for reading and writing data characters into and out of unit 25 are such to enable transfer of a data character to main storage once every CPU cycle (i.e., during each time FT210 every 2 microseconds).

NOISE RECORD DETECTION SECTION 36

Figure 2C:
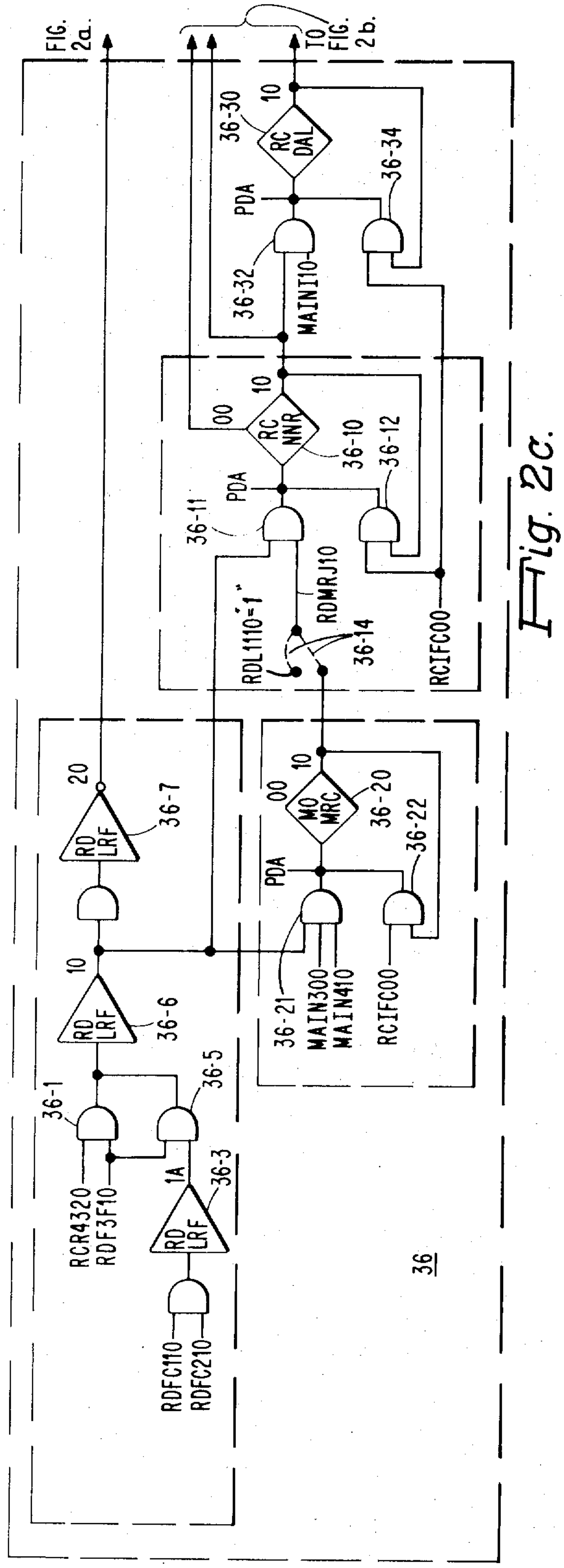
FIG. 2*c* shows in greater detail the noise record detection section of the peripheral controller of FIG. 1.
Figure 3:
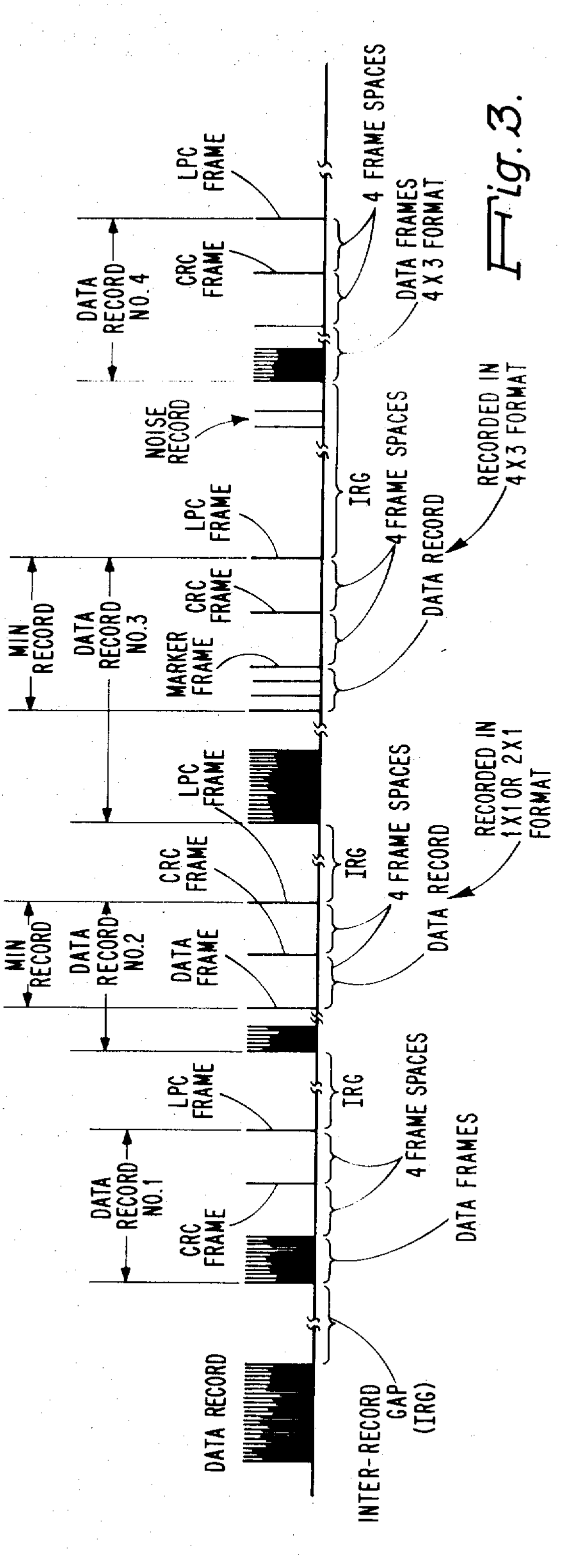
FIG. 3 illustrates the different formats in which records may appear on magnetic tape.

FIG. 2*c* shows the circuits which comprise the noise record detection section 36. The circuits 36-1 through 36-7, arranged as shown, establish a first criterion for signalling when actual record has been found for the different formats being used. Specifically, the AND gate 36-1 establishes the criterion for signals recorded in 1×1 and 2×1 formats (i.e., when signal RCR4320 is a binary ONE) and signals that it has been satisfied (i.e., an actual record has been found) by causing amplifier circuit 36-6 to force signal RDLRF10 to a binary ONE. The criterion is that three frames have been counted as having been read from tape (i.e., signal RDF3F10 is a binary ONE). The number selected corresponds to the minimum size record which can be written on tape in either a 1×1 or 2×1 format. As shown in FIG. 3, the minimum record for both formats includes one data frame, a cyclic redundancy check (CRC) frame and a longitudinal parity check (LPC) frame.

The AND gate and amplifier circuits 36-3 and 36-5 establish the criterion for the 4×3 format and similarly signals that the criterion has been met by forcing signal RDLRF10 to a binary ONE. The criterion for the 4×3 format is that six frames have been counted as having been read from tape (i.e., signal RDFC110, RDFC210 and RDF3F10 are all binary ONES). The minimum record for the 4×3 format, as shown in FIG. 3, includes 3 data frames, 1 marker frame, a CRC frame and a LPC frame. Signal RDLRF10 is applied to a gate and inverter circuit 36-7 and to a not a noise record flip-flop 36-10 which includes a pair of AND gates 36-11 and 36-12 arranged as shown. The jumper circuits 36-14 allow the establishing of a second criterion which must be met before flip-flop 36-10 switches to a binary ONE signalling that the data characters stored in buffer unit 25 constitute not a noise record. By connecting a jumper to apply signal MOMRC10 to AND gate 36-11, the second criterion must be met. This criterion is selected to accordance with the programming requirements of the system. That is, in the present system, some programs can specify a certain minimum number of data characters which can represent an actual record in main storage. A flip-flop 36-20 and associated AND gates 36-21 and 36-22 are used to establish this criterion. The criterion is that 12 data characters must have been stored in the buffer storage unit 25 which AND gate 36-21 signals when the in counter 27 forces signals MAIN300 and MAIN410 to binary ONES after signal RDLRF10 has been forced to a binary ONE. AND gate 36-22 resets flip-flop 36-20 to a binary ZERO when signal RCIFC00 is forced to a binary ZERO.

The binary ONE and binary ZERO outputs of the not a noise record flip-flop 36-10 are forwarded to the control section 30. The binary ONE output is also used to switch a data allow flip-flop to a binary ONE via an AND gate 36-22 when increment signal MAINI10 is forced to a binary ONE. The binary ONE output of flip-flop 36-30 is also forwarded to section 30. Both flip-flops 36-10 and 36-30 are reset via AND gates 36-12 and 36-34 respectively when clear signal RCIFC00 is forced to a binary ZERO.

DETAILED DESCRIPTION OF OPERATION

With reference to FIGS. 1, 2a through 2c and the diagrams of FIGS. 3 and 4, the operation of the apparatus of the present invention included in the peripheral controller 20 of FIG. 1 will now be described. Referring first to FIG. 3, it is seen that several data records (i.e., data records 1 through 4) illustrate the manner in which frames recorded in different formats may appear on a section of magnetic tape. As seen from data record 1, data record includes a plurality of data frames, the last frame of which is followed by a CRC frame and a LPC frame spaced 4 frames apart as shown. The LPC frame is succeeded by an interrecord gap (IRG) which approximates 0.6 inches. The next data record corresponds to a data record for characters recorded in either a 1×1 or 2×1 format. A minimum data record for both formats, as mentioned previously, would only include a single data frame followed by a CRC and a LPC frame. Data record 3 illustrates a data record for characters recorded in a 4×3 format. A minimum data record for this format, as also mentioned previously, would only include three data frames, a marker frame followed by a CRC and a LPC frame.

Data record 3 is followed by a "noise record" which is represented as two frames occurring in the interrecord gap area. The "noise record" precedes an actual data record which corresponds to data record 4.

Figure 4:
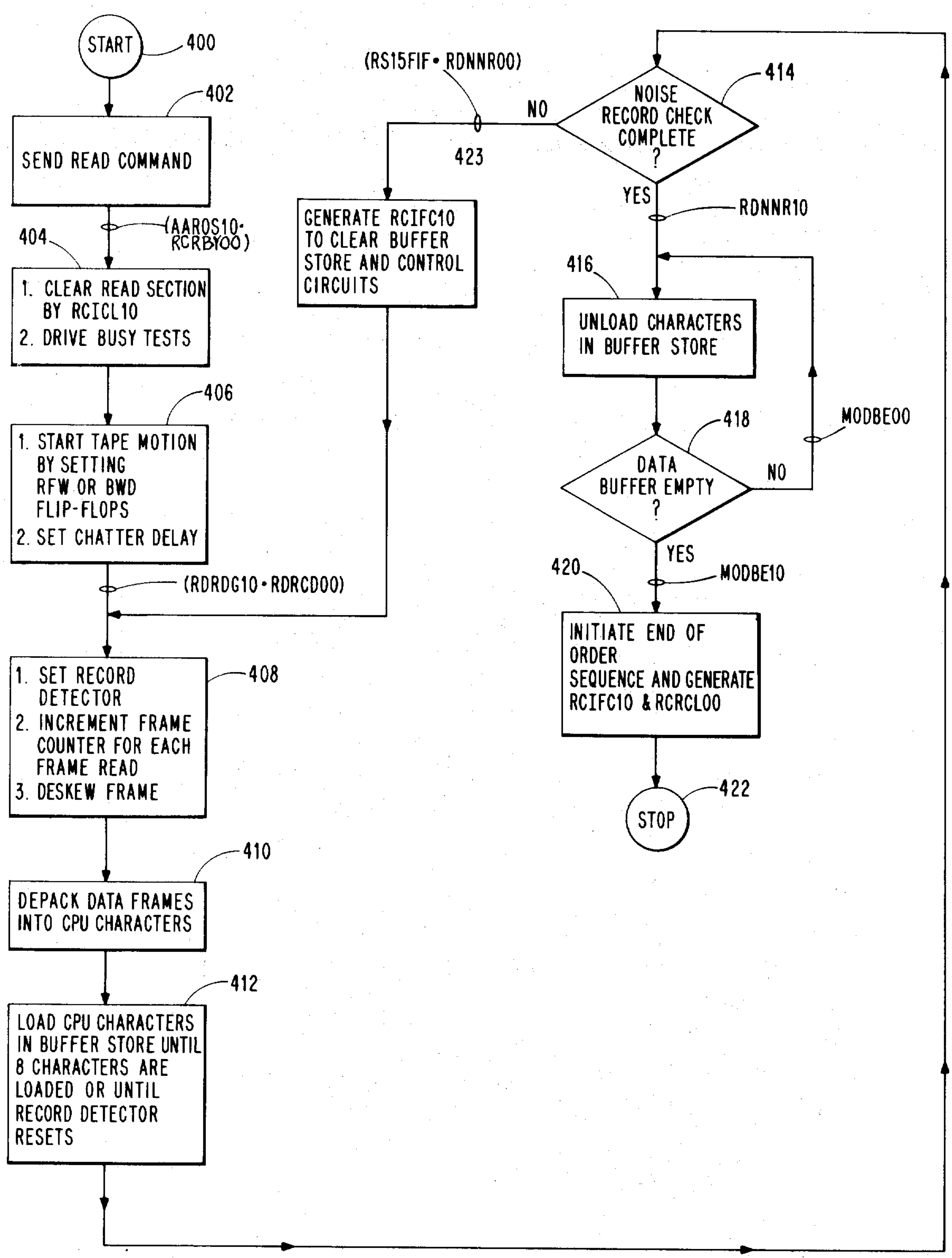
FIG. 4 is a flow chart used in explaining the operation of the apparatus of the present invention.

FIG. 4 illustrates a sequence of operations performed by peripheral controller 20 during the execution of a read command in accordance with the present invention. The read command includes information specifying the type of command, the particular tape device involved in executing the command, whether the tape device is to read tape in a forward or reverse direction and the particular format in which data characters being read are recorded on the magnetic tape medium. The command is received via output bus 14 and conditions the various circuits in control section 30 to store appropriate signal indications required for generating the necessary control signals during the read operation.

The control section 30 upon having stored an indication that a command or order has been received, forces a signal AAROS10 to binary ONE. When the controller 20 determines that it is in a non-busy status (i.e., signal RCRBY00=1), it operates to generate read clear signal RCICL10 which resets the various flip-flops within the read portion of controller 20. For example, this causes signal RCIFC10 to be forced to a binary ONE which sets the read initial and final clear flip-flop 30-1 of FIG. 2*b* to a binary ONE state. This in turn resets the circuits of FIGS. 2*a* through 2*c*. The controller 20 then tests to determine whether the tape device specified is ready for use (i.e., not busy). These operations are set out in blocks 402 and 404 of FIG. 4.

As shown by block 406, the peripheral controller 20 via its control section 30 generates signals to the circuits of block 32 for moving tape in the direction specified. Assuming that the command specifies a normal read operation, control section 30 is operative to set a move data forward (RFW) flip-flop, not shown, which in turn generates the appropriate control signals on control bus 44 instructing the addressed tape device to move tape in the forward direction. Also, as indicated by block 406 of FIG. 4, the controller 20 fires circuits which set delays termed chatter delays. This switches head gate flip-flop 30-1 of FIG. 2*a* to a binary ONE. After the end of the delay, read gate flip-flop 30-1 of FIG. 2*a* enables the sense amplifier circuits 22 of FIG. 1 via signal RCRDE10 to apply the sensed signals in digital form to the deskew buffer circuits 23 and to control section 30.

Upon the occurrence of a signal from the sense amplifier circuits 22 which forces any one of the signals RSNL110 through RSNL910 to a binary ONE, allow zone one shot circuit 30-16 of FIG. 2*a* switches on. This circuit generates a pulse signalling that a frame has been read into the deskew buffer circuits 23. This pulse is operative to increment by one the frame counter 30-20 and to set or turn on the record detector circuit 30-35. The frame read is deskewed by buffer circuits 23 and applied to depacking section 24. These operations are indicated in block 408 of FIG. 4.

As indicated by blocks 410 and 412, the frames are depacked. When the depacked data character is ready for storage in buffer storage unit 25, signal RDBOM10 is forced to a binary ONE which conditions the AND gate and amplifier circuit 30-95 of FIG. 2*b* to force increment sigal MAINI10 to a binary ONE. This signal set flip-flop 30-91 to its binary ONE state which in turn forces signal MAAFI10 to a binary ONE. This applies the incremented address contents of in counter 27 to the memory amplifier circuits MAA01 through MAA04 of FIG. 1. This also initiates a memory cycle during which the location specified by the address sig nals (i.e., location 0000) is addressed and the data character is transferred from section 24 into the buffer storage location of unit 25 via an input register, not shown.

Assuming that data record 2 of FIG. 3 is first being read from the magnetic tape medium so that the peripheral controller 20 is operating to assemble data characters recorded either in a 1×1 or 2×1 format (signal RCR4320 is a binary ONE), the noise record detector section 36 will maintain signal RCNNR10 at a binary ZERO. The reading of the first data frame of record 2 is followed by the reading of the next successive frames which also increment the frame counter 30-20. When the counter 30-20 reaches a count of 3, this forces count 3 frame flip-flop 30-45 to a binary ONE state. The signals RCR4320 and RDF3F10, both binary ONES, force signal RDLRF10 to a binary ONE enabling the not noise record flip-flop 36-10 to be switched to its binary ONE state. Assuming that only a single criterion is being used to define an actual data record, signals RDLRF10 and RDMRJ10, both binary ONES, are operative to switch flip-flop 36-10 to a binary ONE state. This in turn switches data allow flip-flop 36-30 to a binary ONE state when increment signal MAINI10 is switched to a binary ONE state. At that time, the third frame is written into buffer storage unit 25. When flip-flop 36-10 switches to a binary ONE, the noise record check is completed as illustrated by block 414. The controller 20 begins unloading data characters from the buffer unit 25 as soon as data in memory flip-flop 30-78 switches to a binary ONE. When there is a difference of 8, flip-flop 30-78 switches to a binary ONE. This causes the controller 20 to request CPU cycles by forcing signal RCDIM10 to a binary ONE. At the same time, signal RCDIM10 causes the flip-flop 30-90 to be switched to its binary ONE when memory output register 26 is empty, upon timing signal FT710 being forced to a binary ONE. When switched, flip-flop 30-90 forces signal MOAF010 to a binary ONE which applies the address contents of out counter 28 to the amplifier circuits of buffer storage 25. This also initiates a memory cycle during which the contents of the location specified by the address signals are read out into output register 26. Thereafter, the data character stored in register 26 is transferred via bus 15 into main storage. It will also be noted from FIG. 2*b* that signal MOAFO1A causes AND gate and amplifier circuit 30-98 to force increment signal MOOUI10 to a binary ONE which increments out counter 28 by one.

Other cycles follow during which the other data characters stored in buffer storage unit 25 are read out into output register 26 and transferred to main storage until there is less than 8 characters in buffer unit 25. At this time, data in memory flip-flop 30-78 resets to a binary ZERO. This in turn prevents further requests. The loading of buffer unit 25 continues until the CRC and LPC frames have been stored.

As seen from FIG. 3, the tape head is moved into the interrecord gap area and after an interval of 80 frames during which there is an absence of signals, record detector circuit 30-35 of FIG. 2*a* resets. At that time end of record flip-flop 30-50 is switched to a binary ONE. That is, the record detector 30-35 resets, it in turn is operative to switch on resettable one shot circuits 30-38 and 30-39. At that time, circuit 30-44 of FIG. 2a generates pulse RS15F1T which switches flip-flop 30-40 to its binary ONE state. The signals RS15F1T and RCNNR10, both binary ONES, are operative to switch end of record flip-flop 30-50 of FIG. 2*b* to a binary ONE. This in turn causes RDROV1S to switch to a binary ONE. This again switches signal RCD1M10 to a binary ONE to request further CPU cycles. The remaining data characters of data record 2, stored in the buffers store unit 25, are transferred to main storage via output register 26 and input bus 15 of FIG. 1.

It will be noted from FIG. 2*b* that successive CPU cycles are requested until the buffer storage unit 25 is empty. This is determined by detecting, by means not shown, when the counter contents of in counter 27 and out counter 28 are equal. This forces a data buffer empty signal MODBE10 to a binary ONE and signal MODBE00 to a binary ZERO. These operations as indicated by blocks 416 and 418 of FIG. 4.

When the read operation has been established as being over, signal RCRN01A is forced to a binary ZERO which in turn forces signal RCRN02A to a binary ONE. This enables read over flip-flop 30-51 to switch to its binary ONE state. Upon switching, this causes the terminate read flip-flop 30-52 to switch to its binary ONE state which in turn allows the initial and final clear flip-flop 30-62 to be switched to its binary ONE state. Additionally, the terminate read flip-flop 30-52 by forcing signal RCTRD10 to a binary ONE generates signals for clearing the read circuits of the system. The flip-flop 30-62 is operative to clear the circuits of the control section 30 and buffer store as illustrated by block 420 of FIG. 4. Additionally, other control signals are generated by control section 30 which initiate the end of an order sequence resulting in a termination of tape motion and other required operations.

A similar sequence of operations take place when peripheral controller 20 causes the tape device to read data record 3 of FIG. 3. However, in this instance signal RCR4320 of FIG. 2*c* is a binary ZERO indicating that the data characters have been recorded in a 4×3 format. Hence, AND gate and amplifier circuit 36-3 and AND gate 36-5 together establish the criterion for detecting the presence of an actual data record in buffer storage unit 25. More specifically, when six data frames have been sensed and have caused the frame counter to register a count of 6 (i.e., signals RDF3F10, RDFC110 and RDFC210 are binary ONES), signal RDLRF10 is operative to switch not a noise record flip-flop 36-10 to a binary ONE. This initiates a series of operations similar to that described above which enables the data characters stored in the buffer storage unit 25 to be transferred into main storage. Of course, it is assumed again that only a single criterion has been specified (i.e., the jumper connects to apply signal RDL1110 to AND gate 36-11).

It is now assumed that the noise record detector section 36 is arranged to establish two sets of criteria and that the selected tape device is in the process of reading the "noise record" and data record 4 of FIG. 3. Additionally, all circuits are in their reset or binary ZERO states. Accordingly, the first two frames which constitute the noise record are operative to cause frame counter 30-20 to be incremented to a count of 2. Following that, the absence of further signals causes record detector circuit 30-35 to reset. This in turn switches both one shot circuits 30-38 and 30-39 on which produces pulse RS15F1T of FIG. 2*a*. This in turn switches flip-flop 30-40 to its binary ONE state signaling that the record detector had been previously set.

The falling of record detector circuit 30-35 causes the state of no noise record flip-flop 36-10 to be sampled. Since neither criterion established by the circuits of detector section 36 has been met, flip-flop 36-10 is in its binary ZERO state. As illustrated by block 423 of FIG. 4, this causes the control section 30 to generate clear signal which places the circuits of controller 20 in the same state they were just after the start of the read operation. Specifically, signals RCNNR00 and RC15F1F of FIG. 2*b* switch initial and final clear flip-flop 30-62 to its binary ONE state. This is operative to clear the buffer storage unit 25. The clearing of buffer storage unit 25 is accomplished by resetting the stages of in counter 27 and out counter 28 to binary ZEROS. Also, at that time, the control circuits included within control section 30 and noise record detection section 36 are cleared to binary ZEROS.

Since the end of record flip-flop 30-50 has not been switched to a binary ONE (i.e., signal RCNNR10 is a binary ZERO), the terminate read flip-flop 30-52 is not switched to a binary ONE. Hence, no signals are generated to the read clear circuits and an end of order sequence is not initiated. Instead, the peripheral controller 20 continues processing and upon encountering a first frame is operative to again set the read detector circuit 30-35. This is indicated in FIG. 4. The data frames of data record 4 of FIG. 3 are sensed and transferred into buffer circuits 23. Also, each frame causes the frame counter 30-20 to be incremented by 1. Upon the sensing of a 6th frame, amplifier 36-6 of FIG. 2*c* is operative to force signal RDLRF10 to a binary ONE. Since it is required that the second criterion of 12 frames be established, flip-flop 36-10 remains in its binary ZERO state. After two more frames are stored, the data in memory flip-flop 30-78 switches to a binary ONE. Since the second criterion still has not been met, signal RCDIM10 still remains a binary ZERO. After six more frames have been sensed by the amplifier circuits 22, flip-flop 36-20 is switched to its binary ONE state. At this time, not a noise record flip-flop 36-10 is switched to a binary ONE. This in turn switches data allow flip-flop 36-30 and then Data In Memory flip-flop 30-78 to a binary ONE state. At this time, signal RCDIM10 is forced to a binary ONE signalling the interface to request CPU cycles. Also, signal RCDIM10 is operative to switch flip-flop 30-90 to its binary ONE state allowing the contents of out counter 28 to be applied to buffer storage unit 25. This in turn initiates the memory cycle to read out a first data character of record 4 to bus 15. When the difference becomes less than 8, flip-flop 30-78 is switched to a binary ZERO. This forces signal RCDIM10 to a binary ZERO.

Thus, it is seen that only after the established criteria have been met is the peripheral controller 20 able to read out data characters stored in buffer storage unit 25. Further, in the event that the criteria have not been met when the record detector circuit signals an end of record, indicating that the buffer contains a noise record, the control section 30 is operative to clear the buffer storage unit 25 by forcing both counters to their binary ONE states. The peripheral controller 20 continues the read operation until all of the characters of an actual data record have been read and transferred to main storage. At that time, the peripheral controller 20 initiates the end of order sequence and generates clear signal RCIFC10 placing the controller 20 in an initial state. Also, the controller 20 by retaining a minimum number of data characters in buffer storage unit 25 ensures that all of the data characters of a record are correctly transferred to main storage for all data formats (i.e., 4×3 format).

It can be seen that the apparatus of the present invention facilitates the transfer of data characters of data records by automatically detecting and eliminating a noise record before it can be transferred to he main storage of the central processing unit. Hence, no memory storage access cycles are wasted in transferring noise record data characters to storage. Moreover, no errors can be introduced in modifying the addressing of main storage to eliminate noise records stored. Additionally, the present invention provides a means for establishing different criteria based on different system requirements. One each requirement takes into consideration the type of programs being run on the data processing system.

Although the present invention has been described in terms of a magnetic tape device serving as a source of data, it will be obvious that the teachings of the present invention may also be extended to other types of data sources which can erroneously transfer noise records as part of an actual data record.

While in accordance with the provisions and statutes there has been illustrated and described the best form of the invention known, certain changes may be made to the peripheral controller described without departing from the spirit of the invention as set forth in the appended claims and that in some cases, certain features of the present invention may be used to advantage without a corresponding use of other features.

Having described the invention, what is claimed as new and novel is:

1. Apparatus for detecting and eliminating a transfer of noise records to a data processing system received from a data source as units of information, said apparatus being coupled to said data source and to said system, said apparatus comprising:

buffer memory means having a plurality of addressable storage locations, said buffer memory means coupled to receive signals representative of units of information from said source and transfer only signals corresponding to units of information to said system;

addressing means coupled to said buffer memory means, said addressing means being operative to condition said buffer memory means to select an initial storage location and successive locations within said buffer memory means for storing units of information when received from said data source;

noise detection means coupled to said addressing means, said detection means in response to signals accumulated from said data source indicating that a minimum number of said units of information corresponds to a predetermined minimum number has been stored in said buffer memory means being operative to generate a signal for conditioning said addressing means so as to enable read out of said units of information; and, control means coupled to said noise detection means and to said addressing means, said control means being conditioned by said noise detection means in the absence of receiving signals from said data source for a predetermined period of time to force said addressing means to condition said buffer memory means to select again said initial storage location for storage of new signals subsequently received from said source.

2. The apparatus of claim 1 wherein said addressing means includes:

input counter means coupled to said buffer memory means for storing address signals specifying a storage location into which an unit of information received from said source is to be stored; and, output counter means coupled to said buffer means for storing address signals specifying a storage location from which a stored unit of information is to be read out to said system; and said control means conditioned by said signal from said noise detection means to generate a control signal to apply address signals from said output counter to condition said buffer memory means for read out of said units of information.

3. The apparatus of claim 2 wherein said control means includes:

comparator gating means coupled to said input and output counter means, said comparator gating means being operative to produce an output signal upon detecting a difference in value between said address signals of said output counter means and said input counter means corresponding to a predetermined number; and, output means coupled to said noise detection means and to said comparator gating means, said output means being conditioned by said noise detection means to generate said control signal only in the presence of said output signal thereby enabling said read out only when said buffer storage means stores a plurality of units of information corresponding to said predetermined number.

4. The apparatus of claim 3 wherein said control means includes means coupled to said system and to said output means, said means being operative in response to said control signal to apply a cycle request signal to said system for transferring an unit of information from said buffer storage means to said system.

5. The apparatus of claim 1 wherein said noise detection means includes:

first gating means connected to receive a format signal indicating a formatting of said units of information being received from said data source and at least one of said signals indicative of a first predetermined number, said first gating means being operative to produce a first output signal indicating storage of a minimum size record for at least one formatting of said units of information, second gating means connected to receive said signals indicative of a second predetermined number, said second gating means being operative to produce a second output signal indicating storage of a minimum size record for a different formatting of said units of information; and bistable means coupled to said first and second gating means, said bistable means in response to either said first or second output signals being operative to switch from a first to a second state signaling that said units stored constitute a data record;

said control means being conditioned by said bistable means when in said first and second states respectively to enable and inhibit the forcing of said addressing means to select again said initial storage location.

6. The apparatus of claim 5 wherein said noise detection means further includes:

selection means having first and second inputs and an output coupled to said bistable means, said first input being connected to receive a first signal indicating that a first criterion is selected for establishing said minimum size record and said second input being connected to receive a signal indicating that a second criterion is selected for establishing said minimum size record, said selection means being connected to condition said bistable means to be switched to said second state only in response to said accumulated signals indicating that a selected one of said criteria has been met.

7. The apparatus of claim 5 wherein said selection means when arranged to select said first criterion is operative to condition said bistable means to switch to said second state in response to said first and second output signals indicating that said buffer storage means stores a number of units of information corresponding to the minimum size record for a record having units of information arranged in either 1×1 or 2×1 format and in a 4×3 format respectively and wherein said selection means when arranged to select said second criterion is operative to condition said bistable means to switch to said second state in response to accumulated signals indicating that said buffer storage means stores a number of units of information corresponding to a programmed established a larger minimum size record.

8. The apparatus of claim 7 wherein said noise detection means further includes minimum record bistable means, said bistable means being connected to said addressing means and to said first and second gating means for receiving signals representative of the number of units of information stored in said buffer memory means, said minimum record bistable means being connected to said selection means and being operative to switch from a first to a second state generating said signal indicating that said number corresponds to said programmed established minimum size record.

9. The apparatus of claim 8 wherein said control further includes:

frame counter means coupled to said system and to said second gating means, said frame counter means being operative to be set to a predetermined state at an indicated start of transferring units of information constituting a first record, said frame counting means being connected to be incremented in accordance with the number of said units of information received from said system; and, bistable means connected to said frame counter and to said first and second gating means, said bistable means being conditioned to be set to a predetermined state when said frame counter means has advanced to said first predetermined count and said bistable means is in said predetermined state conditioning said first and second gating means to generate said first and second output signals in accordance with said format signals and signals from said frame counter means.

10. The apparatus of claim 1 wherein said control means includes:

record detection control circuit means being connected to receive signals representative of said units of information from said data source, said record detection control circuit means being operative to generate a control signal upon detecting said absence in receiving signals from said source for said predetermined period of time; and, clear control means connected to said noise detection means and to said record detection control circuit means, said clear control means being conditioned by said control signal in the absence of said signal from said noise detection means to generate a clear signal for switching said noise detection means and said record detection control circuit means to initial states and for conditioning said buffer memory means to select again said initial storage location.

11. The apparatus of claim 10 wherein said control means further includes end of record control means connected to said record detection control circuit means and to said clear control means, said end of record control means including bistable storage means, said bistable storage being operative in response to said control signal and said signal from said noise detection means to switch to a predetermined state enabling signaling termination of said transfer to said data source and conditioning of said clear control means to generate said clear signal.

12. In a data processing system, peripheral controller apparatus for transferring to an interface of central processing unit signals read by a magnetic tape device from a magnetic tape in response to request signals generated by cycle means included in said peripheral controller apparatus, said peripheral controller apparatus further including detection means for detecting noise signals constituting noise records read from said magnetic tape as units of information of an actual data record and eliminating a transfer of said noise records to said central processing unit, said detection means comprising:

input register means coupled to said magnetic tape device for receiving said noise and data signals transferred to said peripheral controller apparatus as said units of information;

buffer memory means coupled to input register means and to said central processing unit interface, said buffer storage means having a plurality of addressable storage locations;

addressing means coupled to said buffer storage means, said addressing means being operative to condition said buffer memory means to select an initial storage location and successive locations within said buffer memory means for storing said units of information received from said input register storage means;

noise record detection means coupled to said addressing means, said detection means in response to signals accumulated from said data source indicating that a predetermined minimum number of said units of information has been transferred and stored in said buffer storage means being operative to generate a signal for conditioning said addressing means so as to enable read out of said units of information; and, control means coupled to said noise detection means and to said addressing means, said control means being conditioned by said noise detection means in the absence of said signal and transfer of units of information from said device for a predetermined period of time to force said addressing means to condition said buffer memory means to select again said initial storage location for storing new signals transferred from said input register means.

13. The system of claim 12 wherein said addressing means includes:

input counter means coupled to said buffer memory means for storing address signals specifying a storage location into which an unit of information received from said source is to be stored; and, output counter means coupled to said buffer means for storing address signals specifying a storage location from which a stored unit of information is to be read out to said interface; and said control means conditioned by said noise record detection means upon detecting said predetermined minimum number of generate a control signal to apply address signals from said output counter to condition said buffer memory means for read out of said units of information.

14. The system of claim 13 wherein said control means includes:

comparator gating means coupled to said input and output counter means, said comparator gating means being operative to produce an output signal upon detecting a difference in value between said address signals of said output counter means and said input counter means corresponding to a predetermined number; and, output means coupled to said noise record detection means and to said comparator gating means, said output means being conditioned by said noise record detection means to generate said control signal only in the presence of said output signal thereby enabling said read out only when said buffer memory means stores a plurality of units of information corresponding to said predetermined number.

15. The system of claim 14 wherein said control means includes means coupled to said interface and to said output means, said means being operative in response to said control signal to apply a cycle request signal to said system for transferring an unit of information from said buffer memory means to said interface.

16. The system of claim 12 wherein said noise record detection means includes:

first gating means connected to receive a format signal indicating a formatting of said units of information being received from said data source and at least one of said signals indicative of accumulating a first predetermined number, said first gating means being operative to produce a first output signal indicating storage of a minimum size record for at least one formatting of said units of information, second gating means connected to receive said signals indicative of accumulating a second predetermined count, said first gating means being operative to produce a second output signal indicating storage of a minimum size record for a different formatting of said units of information; and bistable means coupled to said first and second gating means, said bistable means in response to either said first or second output signals being operative to switch from a first to a second state signaling that said units stored constitute an actual data record;

said control means being conditioned by said bistable means when in said first second states respectively to enable and inhibit the forcing of said addressing means to select again said initial storage location.

17. The system of claim 16 wherein said noise record detection means further includes:

selection means having first and second inputs and outputs coupled to said bistable means, said first input being connected to receive a first signal indicating that a first criterion is selected for establishing said minimum size record and said second input being connected to receive a signal indicating that a second criterion is selected for establishing said minimum size record, said selection means being connected to condition said bistable means to be switched to said second state only in response to said accumulated signals indicating that a selected one of said criteria has been met.

18. The system of claim 17 wherein said selection means when arranged to select said first criterion is operative to condition said bistable means to switch to said second state in response to said first and second output signals indicating that said buffer storage means stores a number of units of information corresponding to the minimum size record for a record having units of information arranged in either 1×1 or 2×1 format and in a 4×3 format respectively and wherein said selection means when arranged to select said second criterion is operative to condition said bistable means to switch to said second state in response to accumulated signals indicating that said buffer storage means stores a number of units of information corresponding to a programmed established larger minimum size record.

19. The system of claim 18 wherein said noise record detection means further includes minimum record bistable means, said bistable means being connected to said addressing means and to said first and second gating means for receiving signals representative of the number of units of information stored in said buffer memory means, said record bistable means being connected to said selection means and being operative to switch from a first to a second state generating said signal indicating that said number corresponds to said programmed established minimum size record.

20. A peripheral controller for eliminating a transfer to an input/output interface of noise signals read as units of information from an interrecord gap between data records on a magnetic tape by a magnetic tape device coupled to said controller, said peripheral controller comprising:

storage register means coupled to receive said units of information transferred by said device as read from said magnetic tape;

an addressable buffer memory having a plurality of storage locations, said buffer memory being coupled to said storage register means for receiving said units of information and coupled to said interface for transferring only units of information of an actual data record;

addressing means coupled to said buffer memory, said addressing means being operative to condition said buffer memory to select an initial storage location and successive locations within said memory;

noise record detection means coupled to said addressing means, said noise detection means being operative in response to signals indicating that a minimum number of said units are stored in said memory to generate a signal for conditioning said addressing means to apply address signals to said memory for read out of said units; and, control means coupled to said noise record detection means and to said addressing means, said control means being conditioned by said noise detection means signal in the absence of said signal when there is an absence in recceiving said units from said device for a predetermined period of time to force said addressing means to condition said buffer memory to select again said initial storage location.

21. The peripheral controller of claim 20 wherein said addressing means includes:

input counter means coupled to said buffer memory for storing address signals specifying a storage location into which an unit of information received from said device is to be stored; and, output counter means coupled to said buffer memory for storing address signals specifying a storage location from which a stored unit of information is to be read out to said interface; and said control means conditioned by said noise record detection means upon establishing said minimum number to generate a control signal to apply address signals from said output counter to condition said buffer memory means for read out of said units of information.

22. The peripheral controller of claim 21 wherein said control means includes;

comparator gating means coupled to said input and output counter means, said comparator gating means being operative to produce an output signal upon detecting a difference in value between said address signals of said output counter means and said input counter means corresponding to a predetermined number; and, output means coupled to said noise detection means and to said comparator gating means, said output means being conditioned by said noise record detection means to generate said control signal only in the presence of said output signal thereby enabling said read out only when said buffer storage means stores a plurality of units of information corresponding to said predetermined number.

23. The peripheral controller of claim 22 wherein said control means includes means coupled to said interface and to said output means, said means being operative in response to said control signal to apply a cycle request signal to said interface for transferring an unit of information from said buffer memory to said interface.

24. The peripheral controller of claim 20 wherein said noise record detection means includes:

first gating means connected to receive a format signal indicating a formatting of said units of information being received from said device and one of said signals indicative of a first predetermined number, said first gating means being operative to produce a first output signal indicating storage of a minimum size record for at least one formatting of said units of information, second gating means connected to receive said signals indicative of a second predetermined number, said second gating means being operative to produce a second output signal indicating storage of a minimum size record for a different formatting of said units of information; and bistable means coupled to said first and second gating means, said bistable means in response to either said first or second output signals being operative to switch from a first to a second state signaling that said units stored constitute an actual data record;

said control means being conditioned by said bistable means when in said first and second states respectively to enable and inhibit the forcing of said addressing means to select again said initial storage location.

25. The peripheral controller of claim 24 wherein said noise record detection means further includes:

selection means having first and second inputs and an output coupled to said bistable storage means, said first input being connected to receive a first signal indicating that a first criterion is selected for establishing said minimum size record and said second input being connected to receive a signal indicating that a second criterion is selected for establishing said minimum size record, said selection means being connected to condition said bistable means to be switched to said second only in response to accumulated signals indicating that a selected one of said criteria has been met.

* * * * *

UNITED STATES PATENT OFFICE
CERTIFICATE OF CORRECTION

PATENT NO. : 3,863,228
DATED : January 28, 1975
INVENTOR(S) : Donald R. Taylor

It is certified that error appears in the above-identified patent and that said Letters Patent are hereby corrected as shown below:

Column 18, line 15, delete "of" and insert --to--.

Column 18, line 66, after "first" insert --and--.

Column 20, line 5, delete "recceiving" and insert --receiving--.

Column 22, line 9, after "second" insert --state--.

Signed and sealed this 1st day of July 1975.

(SEAL)
Attest:

RUTH C. MASON
Attesting Officer

C. MARSHALL DANN
Commissioner of Patents
and Trademarks